Feb. 12, 1935.  T. W. VARLEY  1,990,964
ELECTRICAL MEASURING INSTRUMENT
Filed May 11, 1933
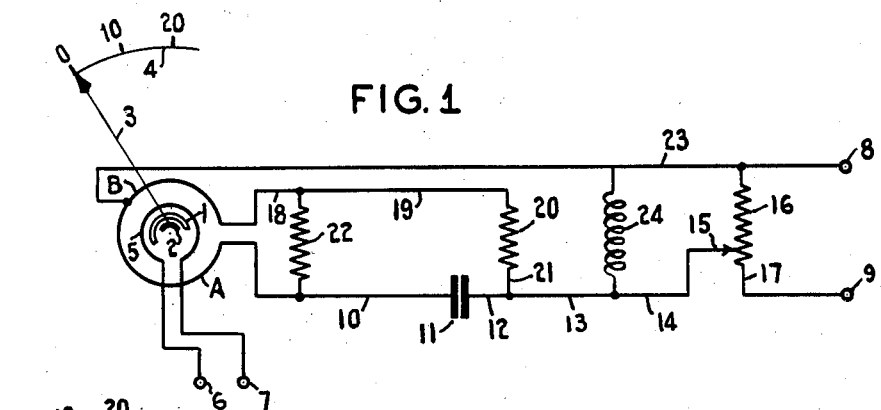
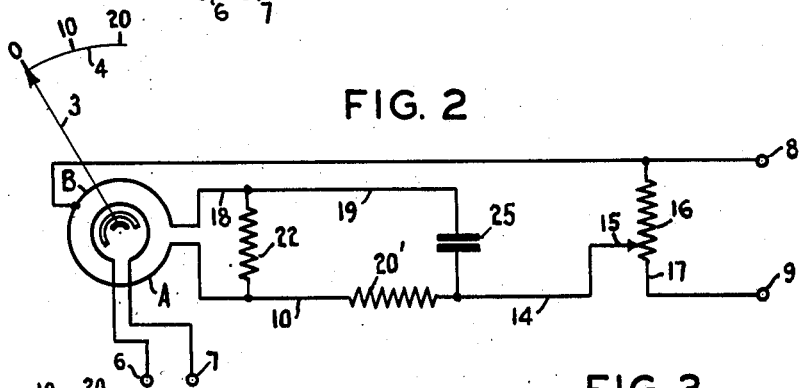
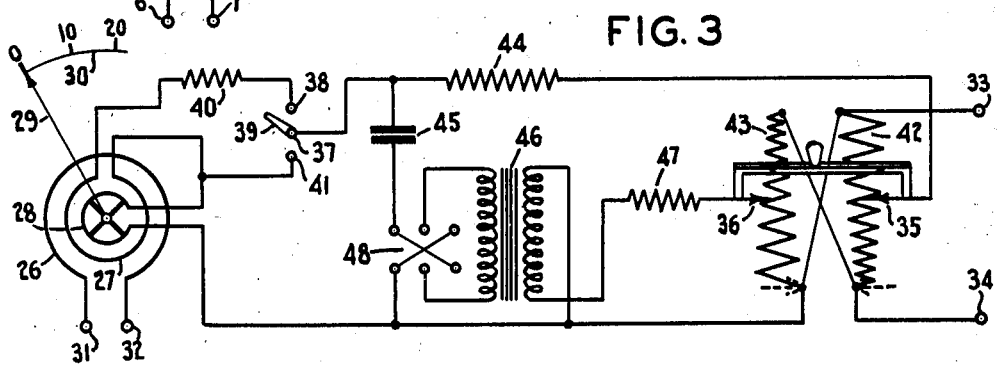
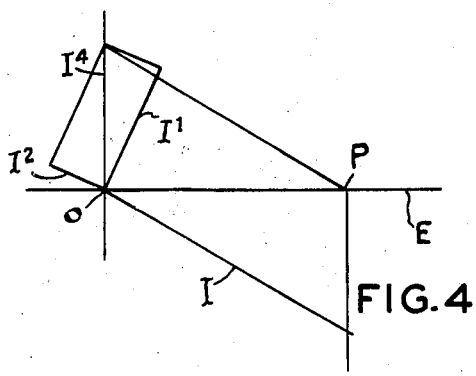
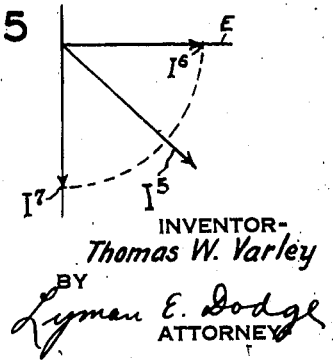
INVENTOR-
*Thomas W. Varley*
BY
*Lyman E. Dodge*
ATTORNEY Patented Feb. 12, 1935

1,990,964

UNITED STATES PATENT OFFICE 1,990,964

ELECTRICAL MEASURING INSTRUMENT

Thomas W. Varley, New York, N. Y.

Application May 11, 1933, Serial No. 670,446

4 Claims. (Cl. 171—95)

This invention relates to alternating currents of electricity, more especially to translating devices operated thereby, and particularly to a translating device of the form known as an indicating electric meter.

A principal object of this invention is the production of a translating device governed in its operation by the three factors characterizing an electric current, to wit: electromotive force, current, and phase angle of the current relative to the electromotive force, all of unknown value, and by a known constant effect.

A further object of the invention is to produce a translating device of the type described which will embody a member movable in relation to a fixed scale, whereby the three factors, electromotive force, current, and phase angle of the current with relation to the electromotive force may be determined.

A further object of the invention is the production of a device of the type described which may be in a form by which direct indication may be given of the numerical value of the factors or components of an electric current, as; the electromotive force, the active current, the reactive current, and the real current; or in a form by which direct indication may be had of the numerical value of; the electromotive force, the watts, the reactive volt amperes, and the volt amperes. By either form, the electromotive force, the real current, the active current, the active volt amperes or the watts, the volt amperes, the reactive volt amperes, the reactive current, and the phase angle of the real current with relation to the electromotive force, may be determined, in that, those factors which are not directly indicated may be obtained by a simple calculation.

Other objects and advantages will appear as the description of the particular physical embodiments selected to illustrate the invention progresses, and the novel features will be particularly pointed out in the appended claims.

The principle upon which the invention is based is that a translating device may be constructed which embodies a member movable with respect to a fixed scale, and this movable member may be made to move so that in both forms it will directly indicate electromotive force; in one form it will directly indicate real current; in the other form it will directly indicate watts; and by the use of supplementary means, effective upon the movable member, involving in one form the maintenance of a constant phase angle with the effect of varying current values, and in the other form the maintenance of a constant absolute value of resultant with a varying phase angle of resultant: the translating device, in the one case, will give a minimum scale indication representing either active or reactive current; and in the other case it will give a maximum scale indication representing volt amperes or a scale indication representing reactive volt amperes.

The novel feature embodied in each of the forms consists in combining with the effect of the electromotive force and load current of the circuit investigated, the effect of relatively known values; in the one case, a constant phase angle with varying current values; and in the other, a resultant constant current value and varying phase angle values.

In describing the invention in detail and the particular physical embodiment selected to illustrate the invention, reference is had to the accompanying drawing, and the several views thereon, in which like parts are designated by like characters of reference throughout the several views, and in which:

Figure 1 is a schematic or diagrammatic illustration of an indicating meter of the soft iron type embodying the invention; Fig. 2 is a schematic or diagrammatic illustration of a soft iron type of meter embodying the invention but of the form by which reactive current is directly indicated rather than active current; Fig. 3 is a schematic or diagrammatic illustration of a dynamometer type of meter embodying the invention; Fig. 4 is a schematic view illustrating the relation of the currents, electromotive forces, and phase angles in the device illustrated by Fig. 1; Fig. 5 is a view similar to Fig. 4, but applicable to the arrangement of Fig. 3.

By one form of the invention, Fig. 1, a direct reading is obtained of electromotive force, real current, and a minimum reading representing either active or reactive current. This form is based upon the "moving iron" type of meter in which there is a stationary and a movable mass of iron, usually positioned concentrically, and both acted upon by magnetizing coils so that the movable mass of iron, by repulsion, is caused to rotate and so cause an indicating hand to move over a graduated scale.

In Fig. 1, numeral 1 designates a fixed mass of iron, and 2 designates a movable mass of iron connected to a pointer 3 which moves over a graduated scale 4.

5 designates a coil to which connection is made by the binding posts 6 and 7. This coil, if connected in series with the load circuit, when slider 15 is at the top, as viewed in Fig. 1, will cause the pointer 3 to move over the graduated scale and indicate real current, that is, current independent of phase angle.

If no connection is made to binding posts 6 and 7, but binding posts 8 and 9 are connected across a source of potential then the pointer 3 will move over the scale and indicate volts when slider 15 is at a calibrated point, preferably maximum voltage position, that is, at the bottom, as viewed in Fig. 1. The energizing coil, when volts is being indicated, is the coil made up of the portions A and B. At any instant the polarity of post 8 may be considered positive, so that the current enters at the intermediate point of the coils A and B going both ways, part through A and part through B. The portion through A returns through wire 10, condenser 11, and wires 12, 13, and 14, to the slider 15 on the resistance coil 16, and thence by wire 17 to the other binding post 9. The current through the coil B will return by wires 18 and 19, resistance 20, and thence by wires 21, 13 and 14 to the slider 15, and so to the resistance 16 and wire 17 to the binding post 9. The impedance of the two paths and the ampere turns of the portions A and B will be such that the voltage will be correctly indicated.

If the binding posts 6 and 7 are connected in circuit with a load, and the binding posts 8 and 9 across a line, and then the slider 15, starting at the top, as viewed in Fig. 1, is adjusted in relation to the resistance 16 so that the pointer 3 indicates a minimum value on the graduated scale 4, the value so indicated will be the active current, sometimes called the in-phase current.

The resistance 22 is inserted to compensate secondary currents flowing through condenser 11.

The condenser 11 is to cause a leading current effect through the coil A, and the resistance 20 is to cause a correction lag in the current through B.

Inductance 24 is placed across the wires 23 and 14 to give a lagging current, which when combined with a leading current due to the combined current through A and B gives a net total in phase with the line voltage, thereby it is possible to use a potentiometer such as 15 and 16, without altering the phase relation of the meter circuits.

If with the soft iron type of meter, it is desired to directly read reactive current instead of active current, then condenser 11 would be replaced by a resistance 20' and resistance 20 would be replaced by a condenser 25, and inductance 24 would be eliminated so that the complete arrangement would be as shown in Fig. 2.

If the meter is used on a circuit connected to binding posts 8 and 9, and the indicator shows a higher reading as the slider 15 is moved downwardly from the top, as viewed in Fig. 1 then the connections to 8 and 9 should be reversed.

By another form of the invention, direct reading is obtained of electromotive force, watts, volt amperes, and reactive volt amperes. This form is based upon the dynamometer type of meter in which there is a stationary coil, and a movable coil connected to an indicating hand to move over a graduated scale.

One arrangement by which applicant may obtain the desired result is shown in Fig. 3. In the figure, numerals 26 and 27 designate fixed coils, and 28 designates a movable coil connected to a pointer 29 which moves over a graduated scale 30.

The fixed coil 26 is connected to the binding posts 31 and 32.

If binding posts 33 and 34 are connected across a line, when sliders 35 and 36 are at the lowest position, that is, in the dotted line position as shown in Fig. 3, and switch points 37 and 38 are connected by the switch arm 39, then the pointer 29 will indicate volts.

Resistance 40 is inserted in circuit with the fixed coil 27 merely for the purpose of adjusting the circuit so that the pointer 29 will agree in its movements with the calibrations.

If the binding posts 31 and 32 are connected in circuit with a load, and the binding posts 33 and 34 across a line, and the switch arm 39 connects the points 37 and 41 then current will flow both through fixed coil 26 and movable coil 28 and with the sliders 35 and 36 at their lowest position, that is, the dotted line position, the pointer 29 will indicate watts. If the pointer moves below 0 then the connections of the line to 33 and 34 should be reversed. This also is true of 31 and 32.

If the binding posts 31 and 32 are connected in circuit with the load, and binding posts 33 and 34 across the line, and switch arm 30 connects the points 37 and 41, then upon moving the sliders 35 and 36 simultaneously, they being connected together mechanically, a position will be reached at which the pointer 29 indicates a maximum. This maximum will be the volt amperes. If when the slider is moved from the bottom position the indicator does not indicate a higher value, then the reversing switch 48 should be thrown to the opposite position.

The sliders 35 and 36 work in connection with the resistances 42 and 43, respectively. Resistances 42 and 43 are similarly formed but reversely arranged. Each resistance is preferably formed by winding resistance wire as though wound upon the frustum of a cone. In the case of 43, the small end of the cone is at the top, as viewed in Fig. 3. In the case of 42 the small end of the cone is at the bottom, as viewed in Fig. 3. By this arrangement, as the sliders 35 and 36 are moved over the resistances 42 and 43, the resistance in the circuit including slider 35 is decreased while the resistance in the circuit including slider 36 is increased or vice versa.

If it is desired to read reactive volt amperes instead of volt amperes, then the sliders 35 and 36 must be pushed to the uppermost part, as viewed in Fig. 3.

The resistance 44 is inserted in the circuit to so adjust the circuit including movable coil 28 that the pointer 29 will in its movement correspond with the graduations of the scale in accordance with the line voltage connected across the binding posts 33 and 34.

Condenser 45 is inserted to cause a leading current in the circuit including the movable coil 28.

The transformer 46 is inserted to isolate the condenser voltages from the resistance voltages.

Resistance 47 is inserted in the circuit of the transformer 46 and the condenser 45 to keep phase relations of the meter circuits constant as the sliders 35 and 36 are shifted.

If when the sliders 35 and 36 are moved from the lowermost position up the resistances, as viewed in Fig. 3, the indicator 29 moves down the scale, then the current at binding posts 33 and 34 is leading. To provide for this, applicant prefers to arrange a reversing switch 48 in the circuit of the condenser 45. With the switch thrown to the right, a lagging current is properly measured, but with the switch thrown to the left, a leading current is properly measured.

In the arrangement, as shown by Fig. 1, the current passing through coil 5 is out of phase with the E. M. F. It may be represented by the line I in Fig. 4, where line E represents the E. M. F.

The current passing through coil A, due to condenser 11, is not quite 90 degrees leading to E. It may be represented by line I' in Fig. 4.

The current passing through coil B, due to the resistance 20, Fig. 1, is slightly lagging and has a negative effect, due to the reverse direction through the coil, so that it may be represented by line $I^2$ in Fig. 4.

The resultant of I' and $I^2$ for all values of the current through coils A and B may be represented by line $I^4$, 90 degrees from E.

If slider 15 is moved from the top, as viewed in Fig. 1, downwardly, that is, if the current is increased in A and B, a point will be reached where the indicator 3 indicates a minimum. This minimum will represent the resultant of I and $I^4$ and will lie on line E and be of a numerical value equal to the active component of I, that is, active amperes.

The gist of the arrangement is the combination of a positive effect from a current leading not quite 90 degrees to an E. M. F. with a negative effect from a current less leading or slightly lagging to produce a resultant, as though the angle of lead of the leading current were exactly 90 degrees to the E. M. F. If such a condition is then combined with an unknown phase current, so that the resultant coincides with the E. M. F. of the unknown phase current, the resultant will be a measure of the active component of the unknown phase current. This resultant may be made to coincide with the E line or the E. M. F. of the current by increasing the value of $I^4$, that is by increasing the values of I' and $I^2$ by moving slider 15, while the phase relation between I' and $I^2$ remains constant.

In the arrangement, as shown by Fig. 3, the current passing through coil 26 may be represented by line $I^5$ in Fig. 5, out of phase with the E. M. F., represented by line E as applied to posts 33 and 34.

The current passing through coil 28 from transformer 46, due to condenser 45, when sliders 35 and 36 are at their lowest position, as viewed in Fig. 3, and 37 is connected to 41, is a minimum, zero, and at an angle such that it would be represented as lying on line $I^7$, at 90 degrees to E, that is, it lags 90 degrees if present.

The current passing through coil 28 through resistance 44, when sliders 35 and 36 are at their lowest position, as viewed in Fig. 3, and 37 is connected to 41 is a maximum, and in phase with the E. M. F., so that it would be represented by a certain distance along E, as at point $I^6$.

As sliders 35 and 36 are moved upwardly, as viewed in Fig. 3, the active value of the $I^6$ current decreases and the reactive value of the $I^7$ current increases. The net effect is as though the resultant were kept constant in value and moved from coincidence with E upwardly as viewed in Fig. 5. When the resultant is such that it could be represented by a line coinciding with $I^5$, the resultant upon the indicator 29 is a maximum and indicates volt amperes.

If it is desired to also read reactive volt amperes, the slider is continued until it reaches the uppermost position, whereupon a reading will be obtained which represents reactive volt amperes. The principle involved in reading reactive volt amperes is that the reactive component is increased while the active component is decreased to a point where the current is all reactive.

When dealing with a leading current the $I^5$ line would be plotted in the lower right quadrant of Fig. 5, the switch 48 would be thrown to the left, and the resultant would move from coincidence with $I^6$ downwardly.

In each form a constant resultant is obtained by the use of two currents. In one form a resultant constant phase angle; in the other form a resultant constant absolute value current. In each form the resultant is combined with the current of unknown phase to determine the numerical value wanted. In one form the resultant current of constant phase angle is increased in value until the resultant of it and the current of unknown phase is in phase with the E. M. F. In the other form the components of the resultant constant absolute value current are varied so that the resultant is in phase with the current of unknown phase.

It is to be understood that although applicant prefers to obtain a resultant, $I^4$, as shown in Fig. 4, nevertheless, if extreme accuracy is not desired, I' may be combined directly with I to give a resultant approximately coinciding with E. In either case applicant combines a current of exact or approximate predetermined relation to the E. M. F. with an unknown current in a predetermined manner.

In the first case, the soft iron type, the predetermined relation is the effect as of 90 degrees phase relation to the E. M. F. In the second case, the dynamometer type, the predetermined relation is the constant absolute resultant of the two currents.

In the first case the predetermined manner of combination is to obtain a resultant in phase with the E. M. F. In the second case the predetermined manner of combination is to bring the resultant in phase with the unknown current.

Although applicant has used a leading effect in the soft iron type description by way of illustration, and made that leading effect 90 degrees out of phase with the E. M. F., nevertheless, it is to be understood that applicant does not thereby mean to exclude a lagging effect, or other out of phase angles.

Although I have particularly described particular physical embodiments of my invention and explained the principle and mode of operation thereof, nevertheless, I desire to have it understood that the forms selected are merely illustrative but do not exhaust the possible physical embodiments of the idea of means underlying my invention.

What I claim as new and desire to secure by Letters Patent, of the United States, is:

1. A translating device including a movable member; two co-acting means whereby the movable member is caused to move, one of the means including a current flow, the other of the means including two currents combined to form a resultant of a predetermined relation to the E. M. F. of the first mentioned current flow; and means for varying a value of the resultant so that it co-acts with the first mentioned current in a predetermined manner whereby movement of the movable member is in accordance with a component of the first mentioned current.

2. The method of exhibiting the value of a component of an electric current, which consists in operating upon a movable member by an unknown component of the current, simultaneously operating upon the same movable member by two currents giving a resultant of predetermined relation to a component of the electric current, and varying a value of the resultant until it combines with the unknown component in a predetermined manner.

3. A translating device including a movable member, a coiled conductor operatively related to the movable member whereby a current flow through the coiled conductor acts upon the movable member; means for supplying current to said coiled conductor; means for providing two other currents; means operated upon by said other currents whereby a resultant is formed; and means for combining a varying component of said resultant with the first mentioned current flow for governing the operation of the movable member.

4. A device for measuring active current, in combination: a scale; a pointer; a soft iron mass attached to the pointer and arranged for rotation, moving the pointer over the scale; a stationary mass of soft iron adjacent the first mentioned mass whereby a flux in the stationary mass causes a movement of the first mentioned mass; a magnetizing coil about the stationary mass for connection in series in an electrical circuit; a second magnetizing coil about the stationary mass; said second mentioned coil having a tap intermediate its ends; means for passing currents through the coil in opposite directions so that the resultant effect will be as of a current displaced 90 degrees in phase from the electromotive-force and means for adjusting the value of the resultant until a minimum reading of the pointer is exhibited whereby active current is indicated.

THOMAS W. VARLEY.